2,907,705
Patented Oct. 6, 1959

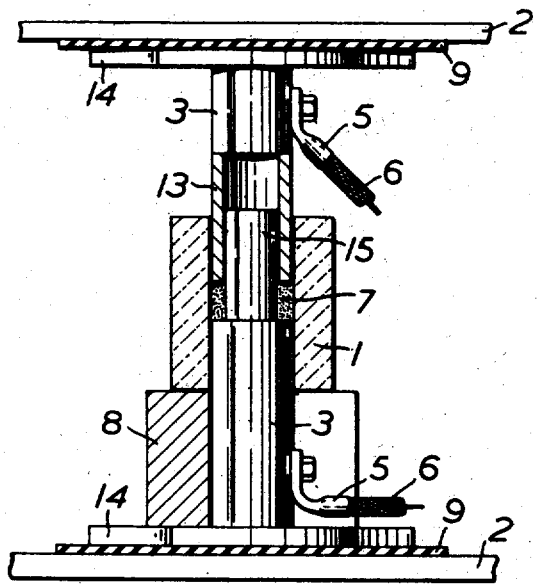
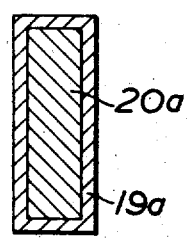
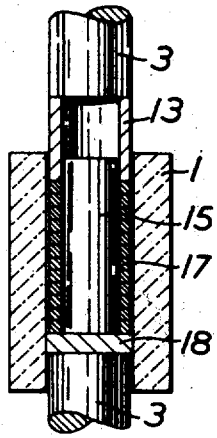
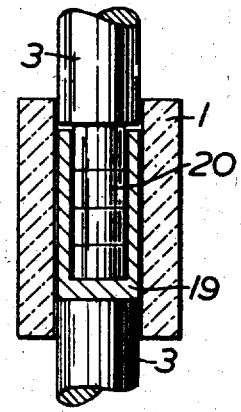
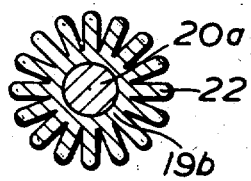
Fig. 1
Fig. 4
Fig. 2
Fig. 3
Fig. 5
ALAN BLAINEY
Inventor

United States Patent Office

2,907,705

THERMAL FISSION REACTOR COMPOSITIONS AND METHOD OF FABRICATING SAME

Alan Blainey, Chilton, England, assignor, by mesne assignments, to the United States of America as represented by the United States Atomic Energy Commission Application November 30, 1948, Serial No. 62,792

10 Claims. (Cl. 204—193.2)

This invention relates to the production of covered or coated bodies containing uranium and/or thorium for use in thermal fission reactors such as the reactor described in co-pending application Serial No. 276,604, filed March 4, 1952, now Patent No. 2,807,580, granted September 24, 1957. It is known that for satisfactory functioning of such bodies it is necessary to ensure a low competitive slow-neutron absorption by impurities present in the bodies and by any protective covering or coating used.

Hitherto aluminium has been employed largely as a protective covering for uranium rods used in thermal fission reactors. Its use however imposes undesirable limitations on the upper temperature limit of operation of such reactors. An object of the invention is to provide a body containing uranium and/or thorium and having a protective coating which while having a low competitive thermal neutron absorption is suitable for use at relatively high temperatures.

In accordance with the invention a body comprising uranium and/or thorium enclosed in heat-conductive material of small neutron-capture cross-section and of relatively high melting point such as beryllium or zirconium is formed by heating and pressing particulate masses of the respective constituent materials into elements or units to the cross-sections required in the finished body and sintering the elements or units together under pressure.

The materials may be metallic powders or flakes or they may be in the form of metallic oxides or carbides for example uranium oxide, thorium oxide, beryllia, zirconia and carbides of the metals.

Among the advantages derived by the invention are, firstly, that the adoption of methods of powder metallurgy permits the use of substances in a non-ductile state and particularly of substances of such small neutron-capture cross-section that thick sheaths are tolerable, secondly, that good mechanical and thermal contact between the parts of the composite body can be secured in a simple manner, the accurate machining of uranium metal and drawing on of metal tubes adopted heretofore being dispensed with, and thirdly, that the closure of the sheath can be effected in the making of the sheath.

These and other objects and advantages will become more apparent from the following description and claims when read on the accompanying drawings, in which:

Fig. 1 shows diagrammatically in section a form of apparatus for preparing rings for sheathing in accordance with the invention;

Fig. 2 shows a detail of Fig. 1 as modified for making an open-ended sheath or container;

Fig. 3 is a detail of Fig. 1 modified for filling the container;

Fig. 4 is a sheathed uranium rod in section; and

Fig. 5 is a cross-section of a sheathed uranium rod showing a sheath having fins.

In a preferred embodiment of the invention elements in the form of rings of sintered beryllium are made by pressing particulate beryllium metal powder in a mould or by the method of electrical heating and compression disclosed in my copending application Serial No. 62,793, filed Nov. 30, 1948, now abandoned. The rings have a radial depth corresponding to the thickness of the protective coating desired. Discs of the same overall diameter of the rings are also prepared from beryllium in a like manner to serve as end closures for the coating. Elements in the form of cylindrical pellets of sintered uranium of external diameter slightly less than the internal diameter of the rings are prepared from particulate uranium by the same technique. The rings are then assembled in a suitable mould or die with a beryllium disc at one end, and are pressed to form an open ended cylinder. The cylinder is filled with the pellets of uranium and the whole subjected to heat and pressure in a mould to cause union of the pellets and spreading of the uranium mass into close contact with the sides of the beryllium cylinder. A second disc of beryllium is now hot pressed on the open end of the cylinder to form an impervious beryllium envelope for the uranium.

Alternatively the rings may be cold-pressed together while the pellets are resistance heated and pressed by impact, the body as a whole being then brought to a high temperature and the rings and discs sintered together under pressure.

A bonding material such as aluminium powder may be mixed with the beryllium to enable a lower sintering temperature to be employed. The sintering may be carried out in a relatively inert atmosphere produced by petroleum hydrocarbons, for example by admixture of paraffin oil or petroleum oil with the initial particulate mixtures and/or by dipping the rings and discs in oil prior to or during assembly.

In a similar manner bodies of uranium oxide and/or thorium oxide, sheathed in beryllia may be prepared or the carbides of the metals may be employed.

Sheathed uranium bodies are for some reactors required to have a surface-volume ratio substantially greater than that of a long cylinder to increase the rate of heat transfer to coolant flowing over the surface. Cylindrical bodies with radial fins, prismatic bodies of star-shaped cross-section and tubular bodies with or without radial fins are suitable in such cases and may be made in accordance with the invention by sintering together short elements of the appropriate shape. For example, a tubular sheathed body may be built up of co-axial rings of sintered beryllium and sintered uranium.

In the drawing the reference numeral 2 represents the platens of a hydraulic or other press or members by which impact may be applied to plungers 3. The latter are carried by plates 14 separated from members 2 by insulation 9. A tube 1 of graphite, silica (or metal if electrical heating is not desired) is carried by a support 8. The upper plunger 3 is partly hollow as at 13 so as to receive a cylinder 15 of silica, graphite, alumina (or metal if electrical heating is not employed).

To form the rings, beryllium or zirconium in particulate form 7, is pressed in the space between tube 1 and cylinder 15 at ordinary temperatures employing a pressure of 50 tons per square inch. A number of such rings 17 are assembled in tube 1 on a sintered disc of beryllium or zirconium 18, and the whole subjected to pressure of about 50 tons per square inch without application of heat. The cylinder 15 is then removed an pellets 20 of compacted uranium filled into the open-ended cylinder 19 (Fig. 3). The upper plunger 3 is replaced by a solid plunger and pressure is applied to the whole assembly while electric current is passed through it by way of electrical conduits 6 to raise the temperature to the sintering point. Finally a further sintered disc of beryllium or zirconium is applied to the open end and the whole heated and pressed once more. The result is a sheathed rod of uranium (Fig. 4) consisting of a uranium rod 20a with a sheath of beryllium or zirconium 19a.

The sheathed rod shown in section in Fig. 5 is produced by employing a tube 1 having internal recesses corresponding to the radial fins 22 in the production of the rings 17, the container 19 and the finished sheathed rod. The finned sheath 19b of beryllium or zirconium encloses the uranium rod 20a.

I claim:

1. A method of producing a body comprising uranium enclosed in an envelope of beryllium, wherein masses of particulate beryllium are formed into elements of the cross section required in the envelope of the body by pressing the said masses while heated to a sintering temperature, the said elements are assembled with a sintered closure of beryllium and pressed while heated to a sintering temperature to form an open ended envelope, masses of particulate uranium are formed into elements of the cross-section required in the body by pressing the said masses of particulate uranium at a softening temperature, the said elements of uranium are introduced into the open-ended envelope to fill the same and are pressed while heated to cause them to adhere together and to spread into contact with the envelope and the envelope is sealed with a closure of beryllium pressed at a sintering temperature on to the open end of the envelope.

2. A method of producing a body comprising a first substance selected from the group consisting of uranium, thorium, and oxides and carbides thereof enclosed in an envelope of a second substance selected from the group consisting of beryllium, zirconium, and oxides and carbides thereof, wherein masses of particulate second substance are formed into elements of the cross section required in the envelope of the body by pressing the said mass while heated, the elements are assembled with a sintered closure of said second substance and pressed while heated to a sintering temperature to form an open-ended envelope, masses of particulate first substance are formed into elements of the cross-section required in the body by pressing the said masses of particulate first substance at a sintering temperature, the said elements of said first substance are introduced into the open-ended envelope to fill the same and are pressed while heated to cause them to adhere together and to spread into contact with the envelope, and the filled envelope is sealed with a closure of said second substance applied to the open end with pressure while heated to a sintering temperature.

3. A body for use in a thermal fission reactor comprising a central core constituted by a series of cylindrical elements of sintered uranium joined together and a protective envelope in close contact with the core and constituted by annular elements of sintered beryllium joined together and sealed at the ends by discs of sintered beryllium.

4. A body according to claim 3 wherein the annular elements of sintered beryllium are furnished with radial fins.

5. A body for use in a thermal fission reactor comprising a sintered compressed mass of a substance of the group consisting of uranium, thorium and oxides and carbides of uranium and thorium, enclosed in an envelope of a sintered, compacted, heat-conductive material of the group consisting of beryllium, zirconium, and oxides and carbides of beryllium and zirconium.

6. A body for use in a thermal fission reactor comprising a core of a substance of the group consisting of uranium, thorium, and oxides and carbides of uranium and thorium, enclosed in an envelope of a sintered compacted heat-conductive material of the group consisting of beryllium, zirconium, oxides and carbides of beryllium and zirconium.

7. A body for use as in a thermal nuclear fission reactor, comprising, a sintered compressed mass of particulate uranium, and an envelope of sintered compressed particulate beryllium completely enclosing and covering the said sintered compressed mass of particulate uranium and in intimate contact therewith.

8. A body for use in a thermal nuclear fission reactor, comprising, a sintered compressed mass of particulate thorium, and an envelope of sintered compressed particulate beryllium enclosing and completely covering the said sintered compressed mass of particulate thorium and in intimate contact therewith.

9. A body for use in a thermal fission reactor, comprising, a sintered mass of uranium oxide, and an envelope of sintered beryllia completely enclosing and covering the said sintered mass of uranium oxide and in intimate contact therewith.

10. A body for use in a nuclear fission reactor comprising a sintered compacted uranium mass and a sintered compacted envelope comprising zirconium completely enclosing the said uranium mass and in intimate contact therewith.

References Cited in the file of this patent

UNITED STATES PATENTS

| Number | Name | Date |
|---|---|---|
| 982,751 | Thowless | Jan. 24, 1911 |
| 1,566,793 | Gero | Dec. 22, 1925 |
| 1,670,463 | Marden | May 22, 1928 |
| 2,167,544 | De Bats et al. | July 25, 1939 |
| 2,313,227 | De Bats | Mar. 9, 1943 |
| 2,372,605 | Ross | Mar. 27, 1945 |
| 2,373,405 | Lowit | Apr. 10, 1945 |
| 2,387,073 | Horlacher | Oct. 16, 1945 |
| 2,453,118 | Buckingham et al. | Nov. 9, 1948 |
| 2,468,129 | Spencer | Apr. 26, 1949 |
| 2,477,601 | Hanson | Aug. 2, 1949 |